United States Patent [19]

Koden et al.

[11] Patent Number: 5,026,506
[45] Date of Patent: Jun. 25, 1991

[54] CHIRAL SMECTIC LIQUID CRYSTAL COMPOSITION

[75] Inventors: Mitsuhiro Koden; Tomoaki Kuratate, both of Nara; Fumiaki Funada, Yamatokoriyama; Kazuhiko Sakaguchi, Toyonaka; Naoya Kasai, Amagasaki; Yoshikazu Takehira, Itami, all of Japan

[73] Assignees: Sharp Kabushiki Kaisha; Daiso Co., Ltd., both of Osaka, Japan

[21] Appl. No.: 318,817

[22] Filed: Mar. 3, 1989

[30] Foreign Application Priority Data

Mar. 4, 1988 [JP] Japan .................................. 63-51818

[51] Int. Cl.$^5$ ...................... C09K 19/34; C09K 19/00
[52] U.S. Cl. ............................ 252/299.61; 252/299.01
[58] Field of Search ................... 252/299.01, 299.61; 350/350 S; 549/322, 323

[56] References Cited

U.S. PATENT DOCUMENTS 4,818,431 4/1989 Eidenschink et al. ......... 252/299.61
4,909,957 3/1990 Sakaguchi et al. ............. 252/299.61

FOREIGN PATENT DOCUMENTS 0306919 11/1989 European Pat. Off. .

Primary Examiner—John S. Maples
Assistant Examiner—Shean C. Wu
Attorney, Agent, or Firm—Birch, Stewart, Kolasch & Birch

[57] ABSTRACT

A chiral smectic liquid crystal composition comprising one or more liquid crystalline compound exhibiting a smectic C phase and at least one compound of the formula (A):

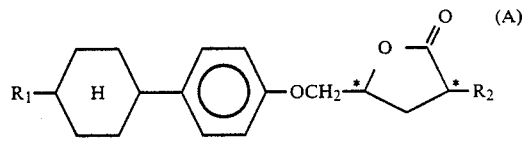

wherein $R_1$ and $R_2$ are same or different and are each a straight-chain or branched-chain alkyl group having 1 to 12 carbon atoms, and each C marked with * is an optically active carbon atoms, and a liquid crystal display device containing it.

11 Claims, No Drawings

CHIRAL SMECTIC LIQUID CRYSTAL COMPOSITION

BACKGROUND OF THE INVENTION

1. Field of the Invention

The present invention relates to liquid crystal compositions exhibiting a chiral smectic C phase, and more particularly to liquid crystal compositions exhibiting the chiral smectic C phase and useful for ferroelectric liquid crystal display devices with high capacities and wide viewing angles.

2. Description of the Prior Art

Presently liquid crystal display devices predominantly utilize the nematic phase of liquid crystals, while active research has also been conducted in recent years on various display modes utilizing a smectic phase. Especially promising is ferroelectric liquid crystal display utilizing a chiral smectic C phase (hereinafter referred to merely as "ferroelectric liquid crystal display") because this mode of display is adapted to high-capacity display with wide viewing angles.

Unlike usual TN (twisted nematic) liquid crystal display, however, ferroelectric liquid crystal display, which utilizes the memory characteristics of the smectic C phase, requires a higher response speed for an increased display capacity. For example, when a drive method is used wherein one screen is rewritten at 1/60 sec with application of 4 pulses for rewriting one line, the response speed $\tau$ has the following relationship with the number of lines, L, that can be displayed at this speed.

$$4 \times \tau \times L = 1/60 \text{ sec}$$

Thus, an exceedingly high response speed is required of the liquid crystals for use in high-capacity liquid crystal display devices.

To fulfill various requirements, therefore, liquid crystal compositions incorporating a plurality of compounds are conventionally used for ferroelectric liquid crystal display as is the case with nematic liquid crystal display, whereas compositions which are fully satisfactory in respect of the response speed still remain to be developed.

While the liquid crystal composition for ferroelectric liquid crystal display must be highly responsive as stated above, the other properties desirable for the composition include the following. First, the composition needs to exhibit the smectic C phase at around room temperature. Further to be satisfactory in the orientation of liquid crystals, the composition preferably exhibits IAC (isotropic-smectic A-smectic C) or INAC (isotropic-nematic-smectic A-smectic C) phase series.

From the foregoing viewpoint, we have carried out intensive research and consequently found that a chiral smectic liquid crystal composition having high responsibility and the desired properties described for use in ferroelectric liquid crystal display can be prepared by admixing a small amount of a compound represented by the formula (A) given below with a liquid crystal compound exhibiting the smectic C phase. The present invention has been accomplished based on this finding.

SUMMARY OF THE INVENTION

Thus, the present invention provides a chiral smectic liquid crystal composition comprising a liquid crystalline compound exhibiting a smectic C phase and at least one compound admixed therewith and represented by the formula (A):

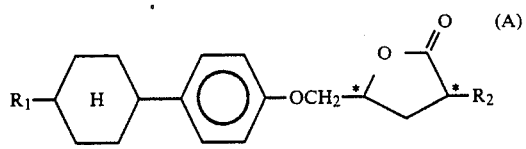

wherein $R_1$ and $R_2$ are the same or different and are each a straight-chain or branched-chain alkyl group having 1 to 12 carbon atoms, and each C marked with * is an optically active carbon atom.

The compound of the formula (A) has two optically active carbon atoms in a framework of a rigid 5-membered ring and therefore free rotation of dipole moiety can be inhibited. Presumably for this reason the liquid crystal composition obtained by admixing this compound with a liquid crystal compound exhibiting the smectic C phase is enhanced in spontaneous polarization and has a greatly improved response speed. It is also possible to prepared liquid crystal compositions exhibiting the smectic C phase at around room temperature, further exhibiting a phase series such as IAC or INAC and having a high response speed, by using a suitably selected smectic liquid crystal compound in combination with the compound of the formula (A) in a suitable ratio.

According to the present invention, chiral smectic liquid crystal compositions can be obtained which are highly responsive and suited to high-capacity ferroelectric liquid crystal display with wide viewing angles. The invention also affords liquid crystal compositions exhibiting the smectic C phase approximately at room temperature and also exhibiting an ideal phase series of liquid crystal.

DESCRIPTION OF THE PREFERRED EMBODIMENTS

The compounds of the formula (A) per se for use in the present invention are novel compounds which have not been disclosed in literature.

With reference to the formula (A), $R_1$ and $R_2$ are the same or different and are each a straight-chain or branched-chain alkyl group having 1 to 12 carbon atoms, more preferably 1 to 11 carbon atoms. Such alkyl groups include methyl, ethyl, propyl, isopropyl, butyl, isobutyl, tert-butyl, pentyl, 2-methylbutyl, 2,2-diemthylpropyl, hexyl, 2- or 3-methylpentyl, 2,2-dimethylbutyl, 4-methylhexyl, 6-methyloctyl, n-heptyl, 2,2,-dimethylpentyl, 3,3-dimethylpentyl, 2,4-dimethylpentyl, n-octyl, 2,2,3,3,-tetramethylbutyl, nonyl, decyl, undecyl, dodecyl and the like. These alkyl groups may contain an asymmetric carbon atom.

In the formula (A), the carbon atoms marked with * are optically active carbon atoms. The compound of the formula (A) are either cis or trans forms, both of which are usable in the invention as well as a mixture in any ratio of cis and trans form.

The compound of the formula (A) can be prepared, for example, by the following process, which nevertheless is not limitative. The compound (A) is prepared as followed. The reaction of optically active epichlorohydrin with a phenol represented by the formula:

in the presence of a base affords a compound of the formula (I):

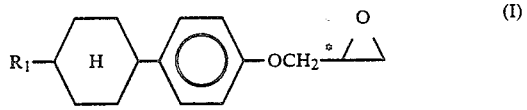

and reacting this compound with a malonic acid ester of the formula (II):

$$R_2-CH(COOR_7)_2 \quad (II)$$

in the presence of a base. In the above formulae, $R_1$ and $R_2$ have the same meaning as in the formula (A), and $R_7$ is a lower alkyl group such as methyl or ethyl.

The phenol to be used for preparing the compound (I) may be prepared by a method generally known in the art, while when the substituent $R_1$ of the phenol is, for example, n-propyl, n-pentyl, n-hexyl, n-heptyl, n-octyl, n-nonyl, n-decyl, undecyl, dodecyl, 6-methyloctyl or the like, commercial products are usable. The solvent, base, etc. to be used for preparing the compound (I) are selected from among those used for usual ether syntesis, and the reaction is conducted under usual conditions. Optically active epichlorohydrin, one of the reactants, is usable also as the solvent, but the solvent to be used can be a polar solvent such as dimethylformamide (DMF), dimethyl sulfoxide (DMSO), dimethylacetamide, acetonitrile, tert-butyl alcohol, water or the like when so required. These solvents are used singly or in admixture. Examples of useful bases are sodium hydroxide, potassium hydroxide and like inorganic bases, and potassium tert-butoxide and like organic bases. Although the reaction for giving the compound (I) proceeds smoothly in the absence of catalyst generally, use of catalyst will be necessary in a few case. Examples of suitable catalysts are quaternary ammonium salts such as benzyltriethyl ammonium chloride, benzyltriethyl ammonium bromide, benzyltrimethyl ammonium chloride, benzyltrimethyl ammonium bromide and the like. When such a catalyst is used, an aqueous solvent is used.

For preparing the compound (I), preferably 1 to 10 equivalents of optically active epichlorohydrin is used based on the phenol. Further it is desirable to use 1 to 5 equivalents of the base relative to the phenol. When the catalyst is used, 0.01 to 0.1 equivalent thereof is used relative to the phenol. It is suitable to conduct the reaction at a temperature of 50° to 80° C. for about 0.5 to about 3 hours.

The malonic acid ester represented by the formula (II) can be prepared by a method generally known in the art, and also commercially available.

The compound of the formula (A) is prepared by reacting the compound (I) with the compound (II) in an organic solvent in the presence of a base.

Examples of useful organic solvent are alcohols such as methanol, ethanol and tert-tutyl alcohol, ethers such as tetrahydrofuran, ethyl ether, dimethoxyethane, diethylene glycol dimethyl ether and dioxane, aprotic polar solvents such as dimethylformamide dimethyl sulfoxide and hexamethylphosphoric triamide, and mixtures of such solvents.

Examples of suitable bases are sodium methoxide, sodium ethoxide, potassium tert-butoxide, sodium hydride, lithium hydride, n-butyl lithium and the like.

In preparing the compound (A), it is desirable to use 1 to 5 equivalents of the compound (II) relative to the compound (I). Preferably 1 to 5 equivalents of the base is used relative to the compound (I). The reaction is conducted, for example, by maintaining the reaction system for 1.5 to 24 hours at the reflux temperature in a low boiling point solvent, but is carried out at a temperature of 70°–90° C. in a high boiling point solvent.

The resulting reaction mixture is acidified with HCl, and the desired compound can be isolated by a usual method such as ether extraction, distillation for removal of the solvent, or purification by separation. For reference, see the relevant examples given later.

According to the present invention, various liquid crystal compounds exhibiting the smectic C phase are usable which are known in the art. Examples of such compounds are those represented by the following formulae (III), (IV) and (V).

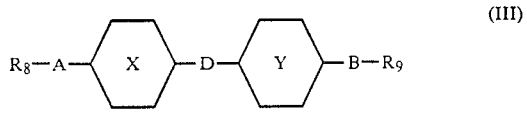

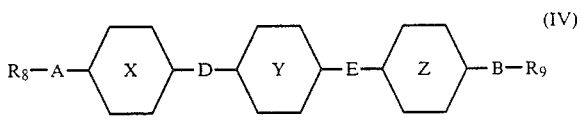

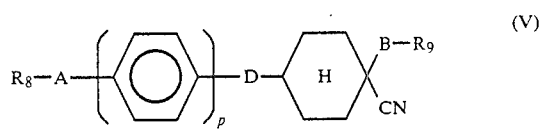

wherein A and B are each a single bond or the group —COO—, —OCO—, —CH=CH—COO—, —O-CO—CH=CH—, —O—, —S—, —OCOO— or —CO—; D and E are each a single bond or the group —COO—, —OCO—, —CH=N—, —N=CH—, —CH=CH—, —C≡C—, —CH=CH—COO—, —O-CO—CH=CH—, —CH₂CH₂—, —OCH₂—, —CH₂O—, —COS— or —SCO—;

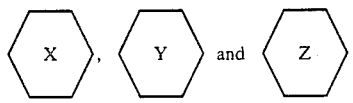

are each a 6-membered ring such as benzene ring, pyridine ring, pyrimidine ring, pyrazine ring, pyridazine ring, piperazine ring, cyclohexane ring, pyran ring, dioxacyclohexane ring, thiapyran ring, dithian ring, thiadiazine ring, bicyclo[2.2.2] octane ring or tetrazine ring, such a 6-membered ring having or not having a fluorine, chlorine or bromine atom, cyano, nitro, lower alkyl or lower alkoxy group or deuterium (D) substituting for the hydrogen atom in the ring; $R_8$ and $R_9$ are each a straight-chain or branched-chain alkyl or alkoxy group having 1 to 12 carbon atoms; and p is an integer of 1 or 2.

Among the smectic liquid crystal compounds exemplified above, desirable are those represented by the following formula (B):

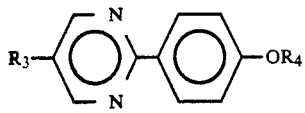
(B)

wherein $R_3$ is a straight-chain or branched-chain alkyl or alkoxy group having 1 to 12 carbon atoms, and $R_4$ is a straight-chain or branched-chain alkyl group having 1 to 12 carbon atoms, because these compounds have a dipole moment perpendicular to the axis of the molecule and therefore give improved thermal stability to the chiral smectic liquid crystal composition obtained to assure the smectic C phase thereof of high thermal stability.

In the above formula (B), examples of alkyl groups represented by $R_3$ and $R_4$ are the same as those represented by $R_1$ or $R_2$ of the formula (A) and already exemplified. Examples of alkoxy groups represented by $R_3$ include alkoxy groups substituted with such an alkyl group.

According to the invention, at least two smectic liquid crystal compounds can be used in admixture. In this case, it is desirable to use the compound of the formula (B) in combination with at least one of the compounds represented by the formula (C):

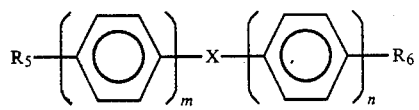
(C)

wherein $R_5$ is the same alkyl or alkoxy group as represented by $R_3$ of the formula (B), $R_6$ is the same alkoxy group as represented by $R_4$ of the formula (B) or an alkoxycarbonyl group having the same alkoxy group, X is —COO—, —OCO— or a single bond, and m and n are each an integer of 1 or 2. The conjoint use of these compounds gives a chiral smectic liquid crystal composition which exhibits a smectic C phase at room temperature with further improved thermal stability. It is suitable to use the compounds of the formulae (B) and (C) usually in the ratio of 10:1 to 1:3 by weight.

The chiral liquid crystal composition of the invention is prepared by admixing an optically active compound of the formula (A) with at least one liquid crystal compound exhibiting the smectic C phase. It is suitable to use the compound of the formula (A) in an amount of 0.5 to 20 wt. %, preferably 1 to 10 wt. %, based on the composition. If the amount is less than 0.5 wt. %, the smectic liquid crystal compound fails to exhibit sufficiently improved responsiveness, whereas amounts exceeding 20 wt. % are unable to assure the smectic C phase of satisfactory thermal stability and are therefore unsuitable.

The chiral smectic liquid crystal composition of the present invention may have incorporated therein various additives such as pitch adjusting chiral compounds and compounds having great Ps insofar as the advantages of the invention are not diminished.

The present invention will be described in greater detail with reference to the following examples, which nevertheless in no way limit the invention.

In the following examples, the R- and S-configurations of optically active compounds (A) of the invention are based on the position numbers of the formula below.

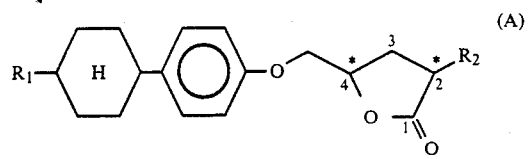
(A)

Preparation of Optically Active Compounds (A)

Example 1-a

A mixture was prepared which was composed of 5.55 g of (R)-(-)-epichlorohydrin (at least 98.5% in chemical purity, at least 99% in optical purity), 2.46 g of 4-(trans-4-n-pentylcyclohexyl)phenol of the formula:

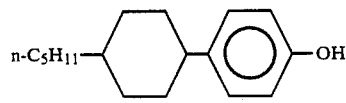

and 0.04 g of benzyltriethyl ammonium chloride. An aqueous solution of sodium hydroxide (0.45 g of NaOH, 15 ml of water) was added dropwise to the mixture with stirring at 60° C. over a period of 20 minutes, and the mixture was then refluxed for 1 hour. The reaction mixture was cooled to room temperature and subjected to extraction with ether twice. The extract was washed with saturated aqueous sodium chloride solution once and distilled in a vacuum to remove the solvent. The residue was purified by silica gel chromatography, giving 1.8 g of (S)-2,3-epoxypropyl-4-(trans-4-n-pentylcyclohexyl)phenyl ether represented by the formula (A'):

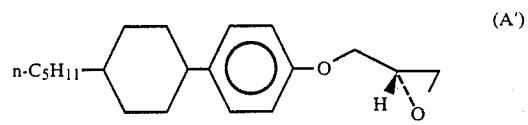
(A')

The physical properties of the compound (A') are given below.

$[\alpha]_D^{25} + 4.44°$ (C=1.36, CH$_2$Cl$_2$).

NMR (CDCl$_3$): δ: 0.45–2.50(21H, m), 2.50–3.00(2H, m), 3.15–3.50(1H, m), 3.70–4.30(2H, m), 6.79 (2H, d, J=9.0 Hz), 7.09 (2H, d, J=9.0 Hz).

Next, a suspension of 224 mg of 50 wt. % of sodium hydride in a mineral oil was washed with dry ether twice, and 10 ml of dry tetrahydrofuran was added to the suspension. While stirring the suspension at 40° C., 130 mg of dimethyl n-butylmalonate was added dropwise thereto, the mixture was stirred for 5 minutes, and 1.41 g of (S)-2,3-epoxypropyl-4-(trans-4-n-pentylcyclohexyl)phenyl ether (A') obtained above was added dropwise to the mixture, followed by refluxing for 20 hours with stirring. After cooling the reaction mixture to room temperature, 4N HCl was added dropwise to the mixture until the pH thereof became 1, and the mixture was subjected to extraction with ether twice, the extract was washed with saturated aqueous NaCl solution once, and the solvent was distilled off in a vacuum. The residue was separated and purified by silica gel chromatography, giving optically active compounds of the following formulae, i.e., γ-lactone derivatives of (2S,4S) isomer (A₁) and (2R, 4S) isomer (A₂) in amounts of 50 mg and 40 mg, respectively.

Optically active compound, (2S,4S) isomer

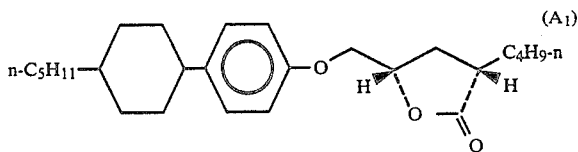

Given below are the physical properties of the compound (A₁) which is a compound not disclosed in literature.

Phase transition temperature $C \xrightarrow{84° C.} I$ $[\alpha]_D^{23}$ +33.45° (C = 0.658, CH₂Cl₂)

NMR (CDCl₃):
δ: 0.88–1.98 (30H, m),
2.38–2.67 (3H, m),
4.07–4.13 (2H, m),
4.67–4.73 (1H, m),
6.83 (2H, d, J=8.3 Hz),
7.12 (2H, d, J=8.3 Hz).
IR (KBr): 1762 cm⁻¹

| Elemental analysis | C | H |
|---|---|---|
| Calcd. for C₂₆H₄₀O₃ (%) | 77.95 | 10.07 |
| Found (%) | 77.91 | 10.12 |

Optically active compound, (2R,4S) isomer

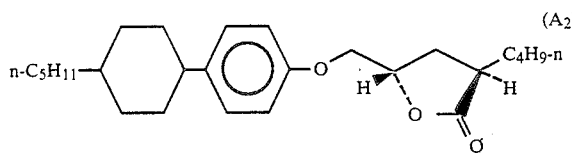

Given below rae the physical properties of the compound (A₂) which is a compound not disclosed in literature.

Phase transition temperature $C \xrightarrow{85° C.} I$ $[\alpha]_D^{24}$ +20.37° (C = 1.05, CH₂Cl₂)

NMR (CDCl₃):
δ: 0.70–2.95 (33H, m),
4.00–4.25 (2H, m),
4.50–4.95 (1H, m),
6.77 (2H, d, J=8.4Hz),
7.11 (2H, d, J=8.4 Hz).
IR (KBr): 1762 cm⁻¹.

Example 1-b

A solution of 716 mg of dimethyl n-heptylmalonate in 1,2-dimethoxyethane was added to a suspension of 163 mg of 50% sodium hydride in dry 1,2-dimethoxyethane, the mixture was stirred for 5 minutes for reaction, and a solution of 940 mg of (S)-2,3-epoxypropyl-4-(trans-4-n-pentylcyclohexyl)phenyl ether prepared as shown in Example 1-a in 1,2-dimethoxyethan was added, followed by heating under reflux with stirring for 2.5 hours. The reaction mixture was cooled to room temperature and acidified with HCl, then subjected to extraction with ether. The solvent was distilled off from the extract, and the residue was purified by silica gel column chromatography, affording (2S,4S) isomer only of a γ-lactone derivative represented by the formula (A₃):

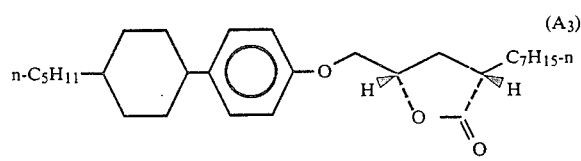

Given below are the physical properties of the compound (A3) which is a compound not disclosed in literature.

Phase transition temperature $C \xrightarrow{110° C.} I$ $[\alpha]_D^{23}$ +27.61° (C = 0.04, CH₂Cl₂)

NMR (CDCl₃): δ: 0.88–1.98 (36H, m), 2.10–2.83 (3H, m), 3.96–4.16 (2H, m), 4.67–4.73 (1H, m), 6.75 (2H, d, J=8.3 Hz) 7.10 (2H, d, J=8.3 Hz).
IR νmax·cm⁻¹: 1765.

Preparation of Chiral Smectic Liquid Crystal Compositions

Example 2

Liquid crystal compositions exhibiting chiral smectic C phase were prepared from the components listed in Table 1. The phase transition temperatures of the compositions are also listed.

Compositions 1 and 2 both exhibit the smectic C phase around room temperature. Composition 1 exhibits IAC phase series, and Composition 2 INAC phase series.

The liquid crystal phases, such as nematic (N) phase, smectic A (S_A) phase and smectic C (S_C) phase, were identified by observing the structure under a polarization microscope equipped with a hot stage and with reference to two-component phase diagrams prepared for checking the compatibility of each liquidcrystalline phase of the compositions of the present invention with that of a known liquid crystal compound.

2M4, 3M5, 4M6 and 6M8 in the formulae listed represent optically active 2-methyl-butyl, 3-methylpentyl, 4-methyl-hexyl and 6-methyl-octyl groups, respectively.

Example 3

Liquid crystal display devices were prepared using the liquid crystal compositions obtained in Example 2. Two glass substrates were each coated with an ITO film and with a nylon film and then rubbed. Next, the two substrates were joined together to provide a cell, 2 μm in thickness, as oriented in the same direction with respect to the rubbing direction. Compositions 1 and 2 given in Table 1 were injected into cells thus formed. Each device was disposed between two polarizers with their axes arranged perpendicular to each other, then subjected to an electric field and checked for variations in the intensity of transmitted light. Table 1 also shows the response speed determined from the variation in the intensity of transmitted light when an electric field of Vp - p=20V was applied.

Table 1 shows that the liquid crystal devices wherein the chiral smectic C liquid crystal composition is used are satisfactory in orientation and highly responsive.

Example 4

Compounds $A_4$ to $A_{13}$ were prepared in the same way as in Examples 1 - a and 1 - b except that phenols prepared by replacing the n-pentyl group in 4-(trans-4-n-pentylcyclohexyl)phenol with one of the groups shown as $R_1$ in the following Table 2 and malonic acid esters prepared by replacing the n-butyl group in dimethyl n-butylmalonate with one of the groups shown as $R_2$ in Table 2 were used for the reaction.

Physical properties of the compounds $A_4$–$A_{13}$ are also shown in the following Table 2.

Example 5

Liquid crystal compositions exhibiting chiral smectic C phase were prepared from the components listed in Table 3. Table 3 also shows the phase transition temperature of each composition and the response speed determined in the same way as in example 3.

TABLE 1

| | Compound | Proportion | Phase transition $S_C$ $S_A$ N I | Response speed |
|---|---|---|---|---|
| Composition 1 | $C_8H_{17}$—[pyrimidine]—[phenyl]—O—4M6 | 15.3% | . 56 . 66 — . | 60 μsec |
| | $C_8H_{17}$—[pyrimidine]—[phenyl]—O—6M8 | 24.1% | | |
| | $C_8H_{17}O$—[pyrimidine]—[phenyl]—O—3M5 | 12.9% | | |
| | $C_{11}H_{23}O$—[pyrimidine]—[phenyl]—O—2M4 | 8.4% | | |
| | $C_{11}H_{23}O$—[pyrimidine]—[phenyl]—O—3M5 | 28.3% | | |
| | $C_6H_{13}$—[pyrimidine]—[phenyl]—OC$_4$H$_8$ | 6.8% | | |
| | (2S,4S)C$_5$H$_{11}$—[H]—[phenyl]—OCH$_2$—*—C$_4$H$_8$ (lactone) | 4.2% | | |
| Composition 2 | $C_8H_{17}$—[pyrimidine]—[phenyl]—O—4M6 | 10.9% | . 50 . 75 . 79 . | 110 μsec |
| | $C_8H_{17}$—[pyrimidine]—[phenyl]—O—6M8 | 17.1% | | |

TABLE 1-continued

| Compound | Proportion | Phase transition $S_C$ $S_A$ N I | Response speed |
|---|---|---|---|
| $C_8H_{17}$—[pyrazine]—[phenyl]—O—3M5 | 9.2% | | |
| $C_{11}H_{23}O$—[pyrazine]—[phenyl]—O—2M4 | 6.0% | | |
| $C_{11}H_{23}O$—[pyrazine]—[phenyl]—O—3M5 | 20.0% | | |
| $C_6H_{13}$—[pyrazine]—[phenyl]—$OC_4H_8$ | 4.8% | | |
| 2M4—O—[phenyl]—[phenyl]—COO—[phenyl]—$OC_8H_{17}$ | 1.2% | | |
| 2M4—O—[phenyl]—[phenyl]—COO—[phenyl]—$OC_{10}H_{21}$ | 1.4% | | |
| 2M4—O—[phenyl]—COO—[phenyl]—[phenyl]—$OC_8H_{17}$ | 3.3% | | |
| $C_7H_{15}O$—[phenyl]—COO—[phenyl]—[phenyl]—O—2M4 | 3.0% | | |
| $C_9H_{19}O$—[phenyl]—COO—[phenyl]—[phenyl]—O—2M4 | 2.3% | | |
| $C_{10}H_{21}O$—[phenyl]—COO—[phenyl]—[phenyl]—O—2M4 | 3.3% | | |
| $C_7H_{15}O$—[phenyl]—[phenyl]—COO—[phenyl]—COO—2M4 | 1.2% | | |
| $C_8H_{17}O$—[phenyl]—[phenyl]—COO—[phenyl]—COO—2M4 | 1.9% | | |
| 2M4—[phenyl]—[phenyl]—COO—[phenyl]—$OC_2H_5$ | 3.3% | | |

TABLE 1-continued

| Compound | Proportion | Phase transition $S_C$ $S_A$ N I | Response speed |
|---|---|---|---|
| 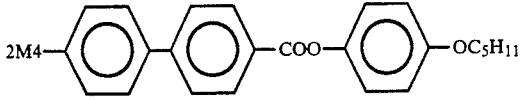 2M4—⌬—⌬—COO—⌬—OC$_5$H$_{11}$ | 4.3% | | |
| 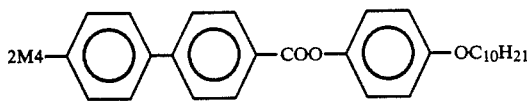 2M4—⌬—⌬—COO—⌬—OC$_{10}$H$_{21}$ | 1.8% | | |
| 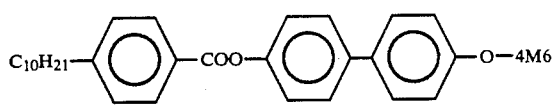 C$_{10}$H$_{21}$—⌬—COO—⌬—⌬—O—4M6 | 1.4% | | |
| 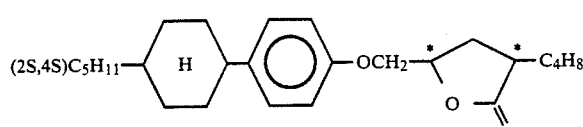 (2S,4S)C$_5$H$_{11}$—H—⌬—OCH$_2$*—[lactone]—*C$_4$H$_8$ | 3.6% | | |

TABLE 2

| Optically Active Compound | $R_1$ | $R_2$ | Absolute Configuration | Melting Point (°C.) | Optical Rotation $[\alpha]_D$ | (°C.), | g/100 ml CH$_2$Cl$_2$ |
|---|---|---|---|---|---|---|---|
| $A_4$ | n-C$_3$H$_7$— | n-C$_9$H$_{19}$— | (2S,4S) | 117 | −31.45, | 30, | 1.432 |
| $A_5$ | " | " | (2R,4S) | 139 | −23.48, | 32, | 1.027 |
| $A_6$ | n-C$_5$H$_{11}$— | CH$_3$— | (2S,4S) | *1 | +14.03, | 27, | 0.493 |
| $A_7$ | " | C$_2$H$_5$— | " | 98 | +29.57, | 24, | 0.165 |
| $A_8$ | " | n-C$_{11}$H$_{23}$— | " | 105 | +21.64, | 29, | 1.085 |
| $A_9$ | " | " | (2R,4S) | 122 | +19.65, | 29, | 1.053 |
| $A_{10}$ | n-C$_9$H$_{19}$— | n-C$_5$H$_{11}$— | (2S,4S) | 98 | +27.52, | 31, | 1.194 |
| $A_{11}$ | " | " | (2R,4S) | 117 | +19.57, | 32, | 1.178 |
| $A_{12}$ | n-C$_5$H$_{11}$— | (CH$_3$)$_2$CH(CH$_2$)$_2$— | (2S,4S) | 93 | +35.24, | 26, | 0.894 |
| $A_{13}$ | " | " | (2R,4S) | 113 | +22.66, | 26, | 0.991 |

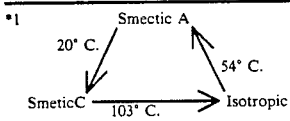

*1
```
            Smectic A
       20° C. ↙    ↖ 54° C.
   SmeticC  ───────→ Isotropic
             103° C.
```

TABLE 3

| Compound | Proportion | Phase transition $S_C$ $S_A$ N I | Response speed |
|---|---|---|---|
| Composition 3 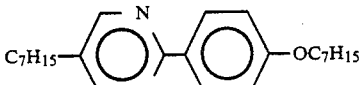 C$_7$H$_{15}$—[pyrazine]—⌬—OC$_7$H$_{15}$ | 10.0% | . 45 . 66 . 70 . | 84 μsec |
| 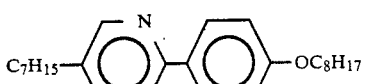 C$_7$H$_{15}$—[pyrazine]—⌬—OC$_8$H$_{17}$ | 4.7% | | |
| 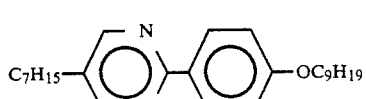 C$_7$H$_{15}$—[pyrazine]—⌬—OC$_9$H$_{19}$ | 16.4% | | |

TABLE 3-continued

| Compound | Proportion | Phase transition $S_C$ $S_A$ N I | Response speed |
|---|---|---|---|
| 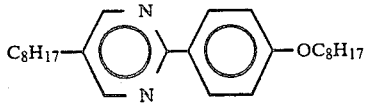 C$_8$H$_{17}$—pyrazine—C$_6$H$_4$—OC$_8$H$_{17}$ | 9.4% | | |
| 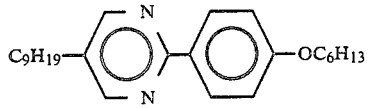 C$_9$H$_{19}$—pyrazine—C$_6$H$_4$—OC$_6$H$_{13}$ | 13.0% | | |
| 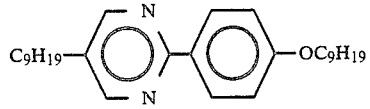 C$_9$H$_{19}$—pyrazine—C$_6$H$_4$—OC$_9$H$_{19}$ | 44.5% | | |
| 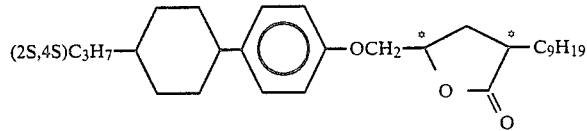 (2S,4S)C$_3$H$_7$—cyclohexyl—C$_6$H$_4$—OCH$_2$—lactone—C$_9$H$_{19}$ | 2.0% | | |
| Composition 4 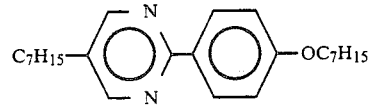 C$_7$H$_{15}$—pyrazine—C$_6$H$_4$—OC$_7$H$_{15}$ | 9.6% | . 41 . 67 . 69 . | 69 μsec |
| 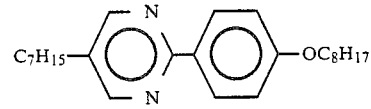 C$_7$H$_{15}$—pyrazine—C$_6$H$_4$—OC$_8$H$_{17}$ | 4.9% | | |
| 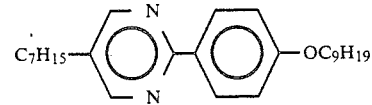 C$_7$H$_{15}$—pyrazine—C$_6$H$_4$—OC$_9$H$_{19}$ | 16.9% | | |
| 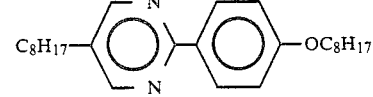 C$_8$H$_{17}$—pyrazine—C$_6$H$_4$—OC$_8$H$_{17}$ | 10.6% | | |
| 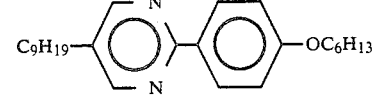 C$_9$H$_{19}$—pyrazine—C$_6$H$_4$—OC$_6$H$_{13}$ | 12.3% | | |
| 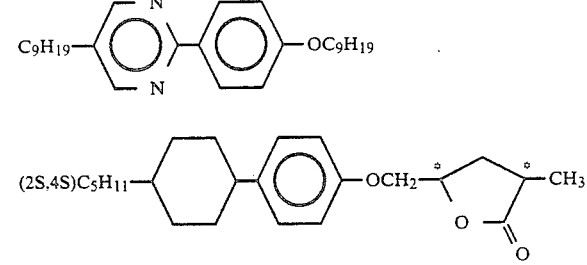 C$_9$H$_{19}$—pyrazine—C$_6$H$_4$—OC$_9$H$_{19}$ | 43.7% | | |
| 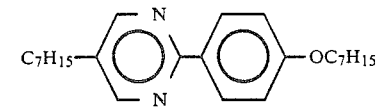 (2S,4S)C$_5$H$_{11}$—cyclohexyl—C$_6$H$_4$—OCH$_2$—lactone—CH$_3$ | 2.0% | | |
| Composition 5 C$_7$H$_{15}$—pyrazine—C$_6$H$_4$—OC$_7$H$_{15}$ | 9.8% | . 46 . 67 . 70 . | 76 μsec |

TABLE 3-continued

| Compound | Proportion | Phase transition $S_C$ $S_A$ N I | Response speed |
|---|---|---|---|
| 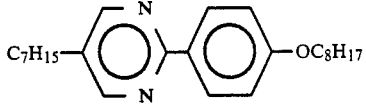 C$_7$H$_{15}$—⟨pyrazine⟩—⟨phenyl⟩—OC$_8$H$_{17}$ | 5.0% | | |
| 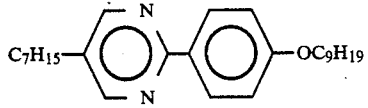 C$_7$H$_{15}$—⟨pyrazine⟩—⟨phenyl⟩—OC$_9$H$_{19}$ | 16.7% | | |
| 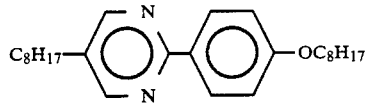 C$_8$H$_{17}$—⟨pyrazine⟩—⟨phenyl⟩—OC$_8$H$_{17}$ | 10.3% | | |
| 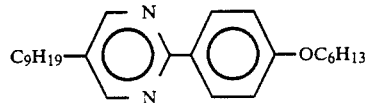 C$_9$H$_{19}$—⟨pyrazine⟩—⟨phenyl⟩—OC$_6$H$_{13}$ | 12.4% | | |
| 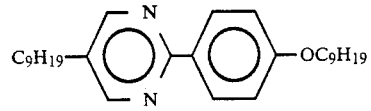 C$_9$H$_{19}$—⟨pyrazine⟩—⟨phenyl⟩—OC$_9$H$_{19}$ | 43.8% | | |
| 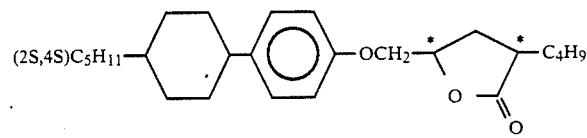 (2S,4S)C$_5$H$_{11}$—⟨cyclohexyl⟩—⟨phenyl⟩—OCH$_2$—*—CH$_2$—*—C$_4$H$_9$ (lactone) | 2.0% | | |
| Composition 6 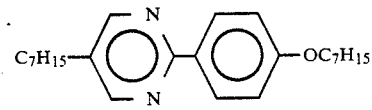 C$_7$H$_{15}$—⟨pyrazine⟩—⟨phenyl⟩—OC$_7$H$_{15}$ | 9.8% | . 48 . 61 . 67 . | 94 μsec |
| 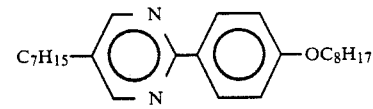 C$_7$H$_{15}$—⟨pyrazine⟩—⟨phenyl⟩—OC$_8$H$_{17}$ | 4.8% | | |
| 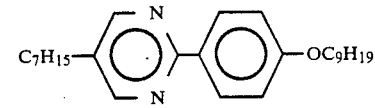 C$_7$H$_{15}$—⟨pyrazine⟩—⟨phenyl⟩—OC$_9$H$_{19}$ | 16.9% | | |
| 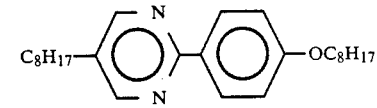 C$_8$H$_{17}$—⟨pyrazine⟩—⟨phenyl⟩—OC$_8$H$_{17}$ | 12.9% | | |
| C$_8$H$_{17}$—⟨pyrazine⟩—⟨phenyl⟩—OC$_{10}$H$_{21}$ | 40.9% | | |
| 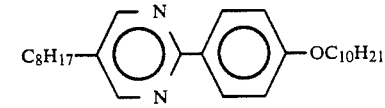 C$_9$H$_{19}$—⟨pyrazine⟩—⟨phenyl⟩—OC$_6$H$_{13}$ | 12.7% | | |

TABLE 3-continued

| Compound | Proportion | Phase transition $S_C$ $S_A$ N I | Response speed |
|---|---|---|---|
| (2S,4S)C₅H₁₁—[cyclohexane]—[phenyl]—OCH₂—*CH—CH₂—*CH(C₄H₉)—O—C=O (lactone) | 2.0% | | |
| Composition 7 | | | |
| C₇H₁₅—[pyrazine]—[phenyl]—OC₇H₁₅ | 4.9% | . 50 . 62 . 68 . | 152 μsec |
| C₇H₁₅—[pyrazine]—[phenyl]—OC₈H₁₇ | 8.8% | | |
| C₇H₁₅—[pyrazine]—[phenyl]—OC₉H₁₉ | 14.7% | | |
| C₈H₁₇—[pyrazine]—[phenyl]—OC₈H₁₇ | 18.6% | | |
| C₈H₁₇—[pyrazine]—[phenyl]—OC₁₀H₂₁ | 33.3% | | |
| C₉H₁₉—[pyrazine]—[phenyl]—OC₆H₁₃ | 17.7% | | |
| (2S,4S)C₅H₁₁—[cyclohexane]—[phenyl]—OCH₂—*CH—CH₂—*CH(C₄H₉)—O—C=O (lactone) | 2.0% | | |
| Composition 8 | | | |
| C₇H₁₅—[pyrazine]—[phenyl]—OC₇H₁₅ | 9.6% | . 46 . 68 . 70 . | 156 μsec |
| C₇H₁₅—[pyrazine]—[phenyl]—OC₈H₁₇ | 4.9% | | |
| C₇H₁₅—[pyrazine]—[phenyl]—OC₉H₁₉ | 16.9% | | |
| C₈H₁₇—[pyrazine]—[phenyl]—OC₈H₁₇ | 10.6% | | |

TABLE 3-continued

| Compound | Proportion | Phase transition $S_C$ $S_A$ N I | Response speed |
|---|---|---|---|
| $C_9H_{19}$—[pyrazine]—[phenyl]—$OC_6H_{13}$ | 12.3% | | |
| $C_9H_{19}$—[pyrazine]—[phenyl]—$OC_9H_{19}$ | 43.7% | | |
| (2R,4S)$C_5H_{11}$—[cyclohexyl]—[phenyl]—$OCH_2$—*—[lactone]—*—$C_4H_9$ | 2.0% | | |
| Composition 9 | | | |
| $C_7H_{15}$—[pyrazine]—[phenyl]—$OC_6H_{13}$ | 4.8% | . 44 . 66 . 69 . | 94 μsec |
| $C_7H_{15}$—[pyrazine]—[phenyl]—$OC_7H_{15}$ | 4.8% | | |
| $C_7H_{15}$—[pyrazine]—[phenyl]—$OC_8H_{17}$ | 23.9% | | |
| $C_7H_{15}$—[pyrazine]—[phenyl]—$OC_9H_{19}$ | 4.8% | | |
| $C_9H_{19}$—[pyrazine]—[phenyl]—$OC_9H_{19}$ | 57.4% | | |
| (2S,4S)$C_5H_{11}$—[cyclohexyl]—[phenyl]—$OCH_2$—*—[lactone]—*—$C_7H_{15}$ | 4.3% | | |
| Composition 10 | | | |
| $C_7H_{15}$—[pyrazine]—[phenyl]—$OC_6H_{13}$ | 4.9% | . 46 . 68 . 70 . | 92 μsec |
| $C_7H_{15}$—[pyrazine]—[phenyl]—$OC_7H_{15}$ | 4.9% | | |
| $C_7H_{15}$—[pyrazine]—[phenyl]—$OC_8H_{17}$ | 24.4% | | |

TABLE 3-continued

| Compound | Proportion | Phase transition $S_C$ $S_A$ N I | Response speed |
|---|---|---|---|
| 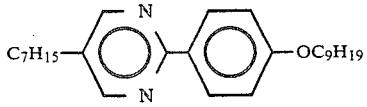 C$_7$H$_{15}$—[pyrazine]—[phenyl]—OC$_9$H$_{19}$ | 4.9% | | |
| 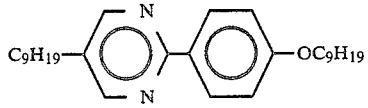 C$_9$H$_{19}$—[pyrazine]—[phenyl]—OC$_9$H$_{19}$ | 58.6% | | |
| 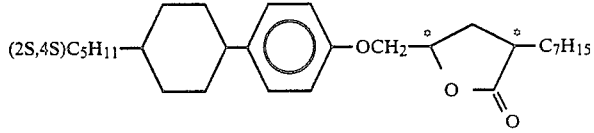 (2S,4S)C$_5$H$_{11}$—[cyclohexyl]—[phenyl]—OCH$_2$—[lactone]—C$_7$H$_{15}$ | 2.3% | | |
| Composition 11 C$_7$H$_{15}$—[pyrazine]—[phenyl]—OC$_7$H$_{15}$ | 10.0% | . 46 . 68 . 69 . | 102 μsec |
| 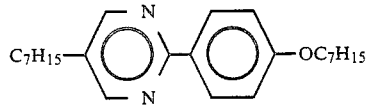 C$_7$H$_{15}$—[pyrazine]—[phenyl]—OC$_8$H$_{17}$ | 4.7% | | |
| 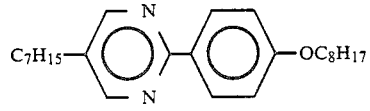 C$_7$H$_{15}$—[pyrazine]—[phenyl]—OC$_9$H$_{19}$ | 16.4% | | |
| 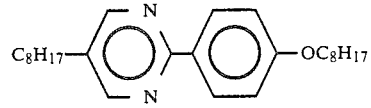 C$_8$H$_{17}$—[pyrazine]—[phenyl]—OC$_8$H$_{17}$ | 9.4% | | |
| 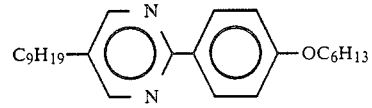 C$_9$H$_{19}$—[pyrazine]—[phenyl]—OC$_6$H$_{13}$ | 13.0% | | |
| 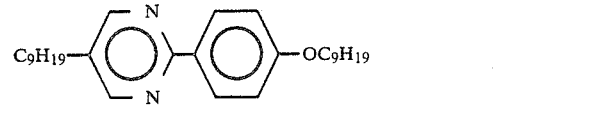 C$_9$H$_{19}$—[pyrazine]—[phenyl]—OC$_9$H$_{19}$ | 44.5% | | |
| 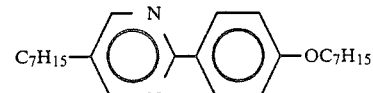 (2S,4S)C$_5$H$_{11}$—[cyclohexyl]—[phenyl]—OCH$_2$—[lactone]—C$_{11}$H$_{23}$ | 2.0% | | |
| Composition 12 C$_7$H$_{15}$—[pyrazine]—[phenyl]—OC$_7$H$_{15}$ | 10.0% | . 46 . 67 . 69 . | 87 μsec |
| 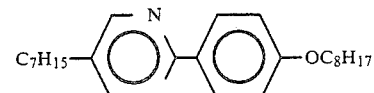 C$_7$H$_{15}$—[pyrazine]—[phenyl]—OC$_8$H$_{17}$ | 4.7% | | |

TABLE 3-continued

| Compound | Proportion | Phase transition $S_C$ $S_A$ N I | Response speed |
|---|---|---|---|
| $C_7H_{15}$—[pyrazine]—[phenyl]—$OC_9H_{19}$ | 16.4% | | |
| $C_8H_{17}$—[pyrazine]—[phenyl]—$OC_8H_{17}$ | 9.4% | | |
| $C_9H_{19}$—[pyrazine]—[phenyl]—$OC_6H_{13}$ | 13.0% | | |
| $C_9H_{19}$—[pyrazine]—[phenyl]—$OC_9H_{19}$ | 44.5% | | |
| (2S,4S)$C_4H_{19}$—[cyclohexyl]—[phenyl]—OCH$_2$*—[lactone]—*$C_5H_{11}$ | 2.0% | | |
| Composition 13 | | | |
| $C_7H_{15}$—[pyrazine]—[phenyl]—$OC_7H_{15}$ | 4.9% | . 48 . 63 . 68 . | 109 μsec |
| $C_7H_{15}$—[pyrazine]—[phenyl]—$OC_8H_{17}$ | 9.8% | | |
| $C_7H_{15}$—[pyrazine]—[phenyl]—$OC_9H_{19}$ | 14.7% | | |
| $C_8H_{17}$—[pyrazine]—[phenyl]—$OC_8H_{17}$ | 19.6% | | |
| $C_8H_{17}$—[pyrazine]—[phenyl]—$OC_{10}H_{21}$ | 29.4% | | |
| $C_9H_{19}$—[pyrazine]—[phenyl]—$OC_6H_{13}$ | 19.6% | | |
| (2S,4S)$C_5H_{11}$—[cyclohexyl]—[phenyl]—OCH$_2$*—[lactone]—*(CH$_2$)$_3$CH(CH$_3$)$_2$ | 2.0% | | |

TABLE 3-continued

| Compound | Proportion | Phase transition $S_C$ $S_A$ N I | Response speed |
|---|---|---|---|
| Composition 14 (C₇H₁₅—⟨N⟩—⟨⟩—OC₇H₁₅) | 4.9% | . 48 . 62 . 68 . | 154 μsec |
| C₇H₁₅—⟨N⟩—⟨⟩—OC₈H₁₇ | 9.8% | | |
| C₇H₁₅—⟨N⟩—⟨⟩—OC₉H₁₉ | 14.7% | | |
| C₈H₁₇—⟨N⟩—⟨⟩—OC₈H₁₇ | 19.6% | | |
| C₈H₁₇—⟨N⟩—⟨⟩—OC₁₀H₂₁ | 29.4% | | |
| C₉H₁₉—⟨N⟩—⟨⟩—OC₆H₁₃ | 19.6% | | |
| (2R,4S)C₅H₁₁—⟨⟩—⟨⟩—OCH₂—*⟨O⟩*—(CH₂)₃CH(CH₃)₂ | 2.0% | | |

What we claim is:

1. A chiral smectic crystal composition comprising a liquid crystalline compound exhibiting a smectic C phase and at least one compound of the formula (A):

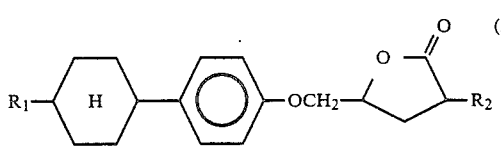

wherein $R_1$ and $R_2$ are the same or different and are each a straight-chain or branched-chain alkyl group having 1 to 12 carbon atoms.

2. A composition of claim 1, wherein in the formula (A) $R_1$ and $R_2$ are each a straight-chain alkyl group having 1 to 11 carbon atoms.

3. A composition of claim 1, wherein $R_2$ and $R_2$ are the same different and are each a methyl, ethyl, propyl, butyl, pentyl, heptyl, nonyl or undecyl group.

4. A composition of claim 1, wherein the liquid crystalline compound exhibiting a smectic C phase is a compound of the formula (B):

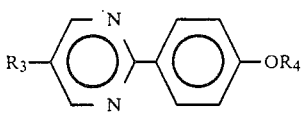

wherein $R_3$ is a straight-chain or branched-chain alkyl or alkoxy group having 1 to 12 carbon atoms, and $R_4$ is a straight-chain or branched-chain alkyl group having 1 to 12 carbon atoms.

5. A composition of claim 1, wherein the liquid crystalline compound is a mixture of one or more compounds of formula (B):

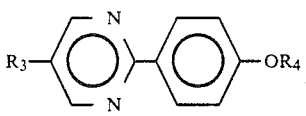

wherein $R_3$ *is a straight-chain or branched-chain alkyl or alkoxy group having* 1 to 12 carbon atoms, and $R_4$ is a straight-chain or branched-chain alkyl group having 1 to 12 carbon atoms; and one or more compounds of the formula (C):

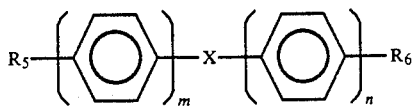

wherein $R_5$ is a straight-chain or branched-chain alkyl or alkoxy group having 1 to 12 carbon atoms, $R_4$ is a straight-chain or branched-chain alkoxy group having 1 to 12 carbon atoms or an alkoxycarbonyl group having the same alkoxy group, X is —COO—, —OCO— or a single bond, and m and n are each an integer of 1 or 2.

6. A liquid crystal display device comprising a chiral smectic liquid crystal composition of any one of claims 1 to 5.

7. A composition of claim 4, wherein in the formula (A) $R_1$ and $R_2$ are each a straight-chain alkyl group having 1 to 11 carbon atoms.

8. A composition of claim 4, wherein $R_1$ and $R_2$ are the same or different and are each a methyl, ethyl, propyl, butyl, pentyl, heptyl, nonyl or undecyl group.

9. A composition of claim wherein $R_1$ and $R_2$ are the same or different and are each selected from the group consisting of methyl, ethyl, propyl, isopropyl, butyl, isobutyl, tert-butyl, pentyl, 2-methylbutyl, 2,2-dimethylpropyl, hexyl, 2-methylpentyl, 3-methylpentyl, 2,2-dimethylbutyl, 4-methylhexyl, 6-methyloctyl, n-heptyl, 2,2-dimethylpentyl, 3,3-dimethylpentyl, 2,4-dimethylpentyl, n-octyl, 2,2,3,3-tetramethylbutyl, nonyl, decyl, undecyl and dodecyl groups.

10. A composition of claim 4, wherein $R_3$ is selected from the group consisting of methyl, ethyl, propyl, isopropyl, butyl, isobutyl, tert-butyl, pentyl, 2-methylbutyl, 2,2-dimethylpropyl, hexyl, 2-methylpentyl, 3-methylpentyl, 2,2-dimethylbutyl, 4-methylhexyl, 6-methyloctyl, n-heptyl, 2,2-dimethylpentyl, 3,3-dimethylpentyl, 2,4-dimethylpentyl, n-octyl, 2,2,3,3-tetramethylbutyl, nonyl, decyl, undecyl, dodecyl and alkoxy groups substituted with these alkyl groups; and $R_4$ is selected from the group consisting of methyl, ethyl, propyl, isopropyl, butyl, isobutyl, tert-butyl, pentyl, 2-methylbutyl, 2,2-dimethylpropyl, hexyl, 2-methylpentyl, 3-methylpentyl, 2,2-dimethylbutyl, 4-methylhexyl, 6-methyloctyl, n-heptyl, 2,2-dimethylpentyl, 3,3-dimethylpentyl, 2,4-dimethylpentyl, n-octyl, 2,2,3,3-tetramethylbutyl, nonyl, decyl, undecyl and dodecyl groups.

11. A composition of claim 5, wherein $R_5$ is selected from the group consisting of methyl, ethyl, propyl, isopropyl, butyl, isobutyl, tert-butyl, pentyl, 2-methylbutyl, 2,2-dimethylpropyl, hexyl, 2-methylpentyl, 3-methylpentyl, 2,2-dimethylbutyl, 4-methylhexyl, 6-methyloctyl, n-heptyl, 2,2-dimethylpentyl, 3,3-dimethylpentyl, 2,4-dimethylpentyl, n-octyl, 2,2,3,3-tetramethylbutyl, nonyl, decyl, undecyl, dodecyl and alkoxy groups substituted with these alkyl groups; and $R_6$ is an alkoxy group substituted with an alkyl group selected from the group consisting of methyl, ethyl, propyl, isopropyl, butyl, isobutyl, tert-butyl, pentyl, 2-methylbutyl, 2,2-dimethylpropyl, hexyl, 2-methylpentyl, 3-methylpentyl, 2,2-dimethylbutyl, 4-methylhexyl, 6-methyloctyl, n-heptyl, 2,2-dimethylpentyl, 3,3-diemthylpentyl, 2,4-dimethylpentyl, n-octyl, 2,2,3,3-tetramethylbutyl, nonyl, decyl, undecyl and dodecyl or an alkoxycarbonyl group substituted with said alkoxy group.

* * * * *